Oct. 29, 1968 H. H. BOSTROM 3,407,993
BLOWER
Filed Oct. 14, 1966 2 Sheets-Sheet 1
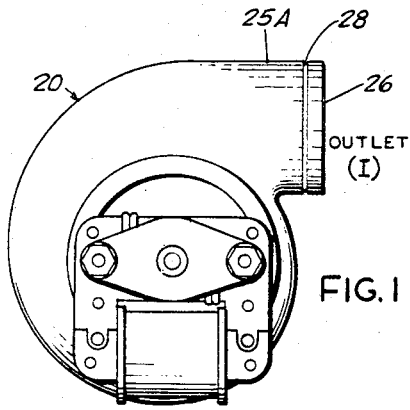
HOUSING 20 MOUNTED FOR ONE HAND OF ROTATION TO POSITION OUTLET
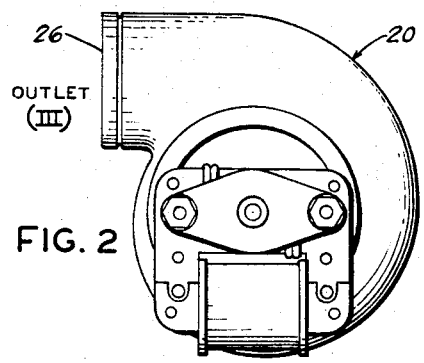
HOUSING 20 REMOUNTED FOR OPPOSITE HAND OF ROTATION TO POSITION OUTLET
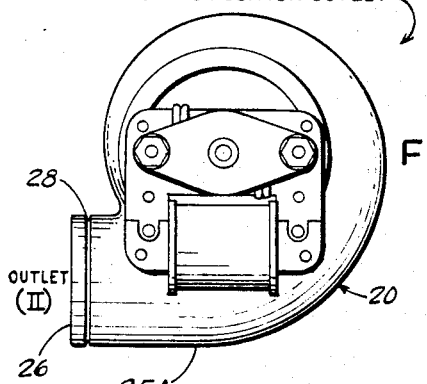
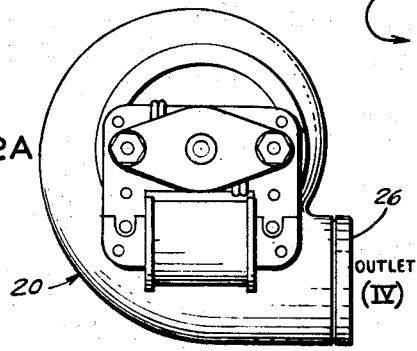
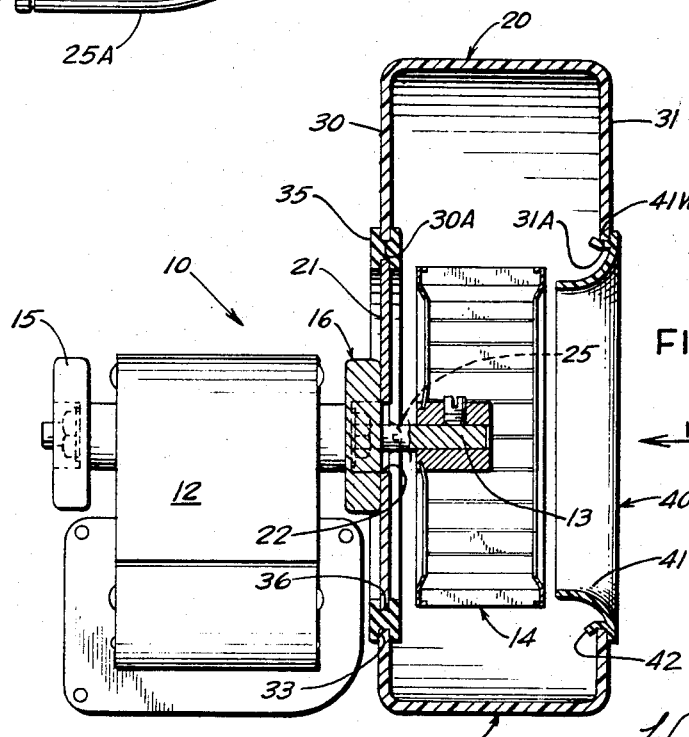
INVENTOR.
HARRY H. BOSTROM
BY
Wallace Kinzer and Dorn
ATTORNEYS Oct. 29, 1968  H. H. BOSTROM  3,407,993
BLOWER Filed Oct. 14, 1966  2 Sheets-Sheet 2

INVENTOR.
HARRY H. BOSTROM
BY
Wallace Hinger and Dow
ATTORNEYS

United States Patent Office 3,407,993
Patented Oct. 29, 1968

3,407,993
BLOWER
Harry H. Bostrom, Chicago, Ill., assignor to Molon Motor & Coil Corp., Rolling Meadows, Ill., a corporation of Illinois
Filed Oct. 14, 1966, Ser. No. 586,779
3 Claims. (Cl. 230—117)

ABSTRACT OF THE DISCLOSURE

A blower comprising a motor driven impeller has an impeller housing of such form and construction as to present two substantially identical inlet openings of which either can be the effective inlet opening while the other is used to frictionally mount the impeller housing on a gasket supported by the motor housing. This enables the impeller housing to be turned to any position to vary the outlet and also enables the impeller housing to be reversed so that different hands of rotation of the impeller housing may be used.

---

This invention relates to an air blower characterized by a driven impeller within a blower housing, and in particular a blower adapted to be used to cool electrical systems subjected to over-heating, such as those commonly employed in computers, business machines and the like.

There are many different kinds of industrial equipment that require air cooling on a relatively small scale, such as office duplicating equipment, industrial electrical system components and the like, and the primary object of the present invention is to construct a blower which embodies a great deal of flexibility insofar as concerns the ability to position the outlet of the blower housing so that the stream of cooling air can be directed as desired. More specifically, it is an object of the present invention to so construct a blower as to enable the impeller or blower housing to be reversibly mounted for rotation in opposite hands of rotation.

Another specific object of the invention is to construct a blower with a one-piece housing having an outlet in a radial wall and a pair of openings in opposite side walls. These openings are of substantially the same size and shape so that either one can serve as the inlet opening and so that either one can alternately be used in locating the impeller housing on a gasket. Hence, the housing can be reversed as to mounting on the gasket, whereby two hands of rotation are available for positioning the impeller housing, the latter being rotatably supported by the gasket on a motor housing.

Other and further objects of the present invention will be apparent from the following description and claims and are illustrated in the accompanying drawings which, by way of illustration, show a preferred embodiment of the present invention and the principles thereof and what is now considered to be the best mode contemplated for applying these principles. Other embodiments of the invention embodying the same or equivalent principles may be used and structural changes may be made as desired by those skilled in the art without departing from the present invention.

In the drawings:

FIG. 1 is a side elevation of a blower constructed in accordance with the present invention, with the blower outlet in one position;

FIG. 1A is an elevational view identical to FIG. 1 except that the housing has been turned through 180°;

FIG. 2 is an elevational view similar to FIG. 1, but wherein the housing has been reversed;

FIG. 2A is an elevational view similar to FIG. 2, but with the outlet positioned at a 180° different position;

FIG. 3 is an elevational view partly in section of the blower of the present invention;

Figure 4:
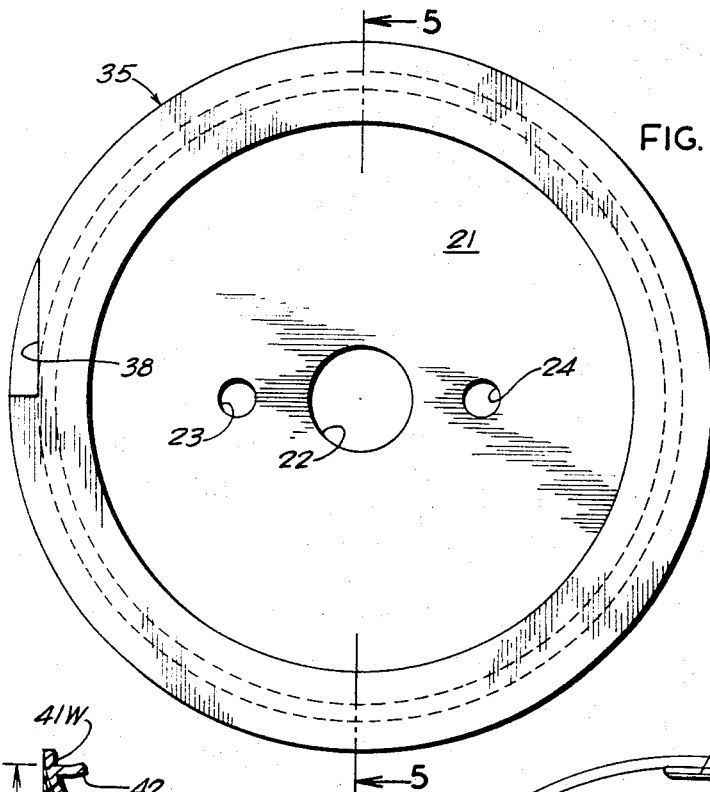
FIG. 4 is a plan view of the gasket.

The blower 10 of the present invention, FIG. 3, comprises a motor assembly 12 affording a motor driven armature 13 to which is fixed an impeller or blower 14.

The motor assembly 12 is associated with a motor support that comprises a pair of end support plates 15 and 16. The inner support plate 16 in particular serves as a support for the impeller housing 20 in a manner now to be described.

Figure 5:
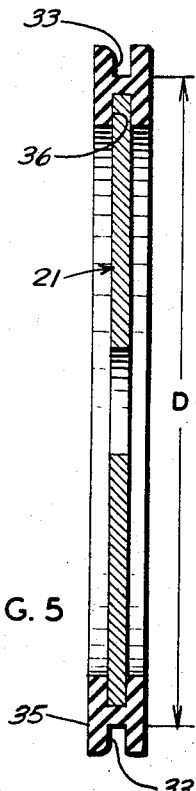
FIG. 5 is a sectional view of the gasket shown in FIG. 4.

Thus, a gasket support plate 21 of aluminum or the like, FIGS. 3, 4 and 5, is of circular form and is provided with a central aperture 22 through which the armature shaft 13 is extended. Two additional openings 23 and 24, FIG. 4, are formed in the gasket support plate 21 along one diameter thereof, and these openings are for the reception of screws as 25', FIG. 3, which serve to fasten and fix the gasket support plate 21 to the support plate 16.

The impeller housing 20 is a one-piece plastic molding presenting a radial wall 25 preferably of vortex contour as will be apparent in FIGS. 1 and 2, and the radial wall terminates in an outlet opening 26, FIGS. 1 and 2, through which the forced air will be delivered when the blower is in operation. In connection with FIGS. 1 and 2, it is to be noted that the end portion 25A of the housing 20 where the outlet is located is formed with a groove 28 enabling a corresponding internal rib of a flexible conduit to be snapped thereinto so that a conduit, if desired, may be secured to the blower outlet to transmit cooling air to a remote location.

The impeller housing is also formed with a pair of side walls 30 and 31, and in the mounted position, the impeller housing of course envelopes or surrounds the impeller 14. The opposite side walls 30 and 31 of the impeller housing are respectively formed with circular openings or apertures 30A and 31A, respectively, being of identical size and shape. This is an important feature of the present invention for reasons presently to be explained.

Thus, in the relationship of parts illustrated in FIG. 3, the peripheral edge presented by the aperture 30A is seal-fitted in the outer groove 33, FIG. 5, of a rubber gasket 35. It will be observed in FIG. 5 that the gasket is H-shaped in cross section, presenting an inner groove 36 in which the outer peripheral portion of the gasket support 21 is sealably fitted. By first assembling the gasket and gasket support as a unit, FIG. 5, this unit is then fixed in position by the screws 25 described above.

As noted, the edge presented by the aperture 30A is adapted to be fitted in the outer groove of the gasket, and in order to facilitate assembly, one side of the gasket 35 is cut away at 38, FIG. 4, to afford a relief slot for "leading" the gasket onto the selected side wall of the impeller housing.

Figure 7:
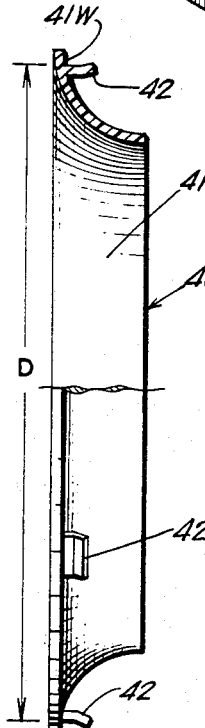
FIG. 7 is a side view of the inlet fitting partly in elevation and partly in section.
Figure 6:
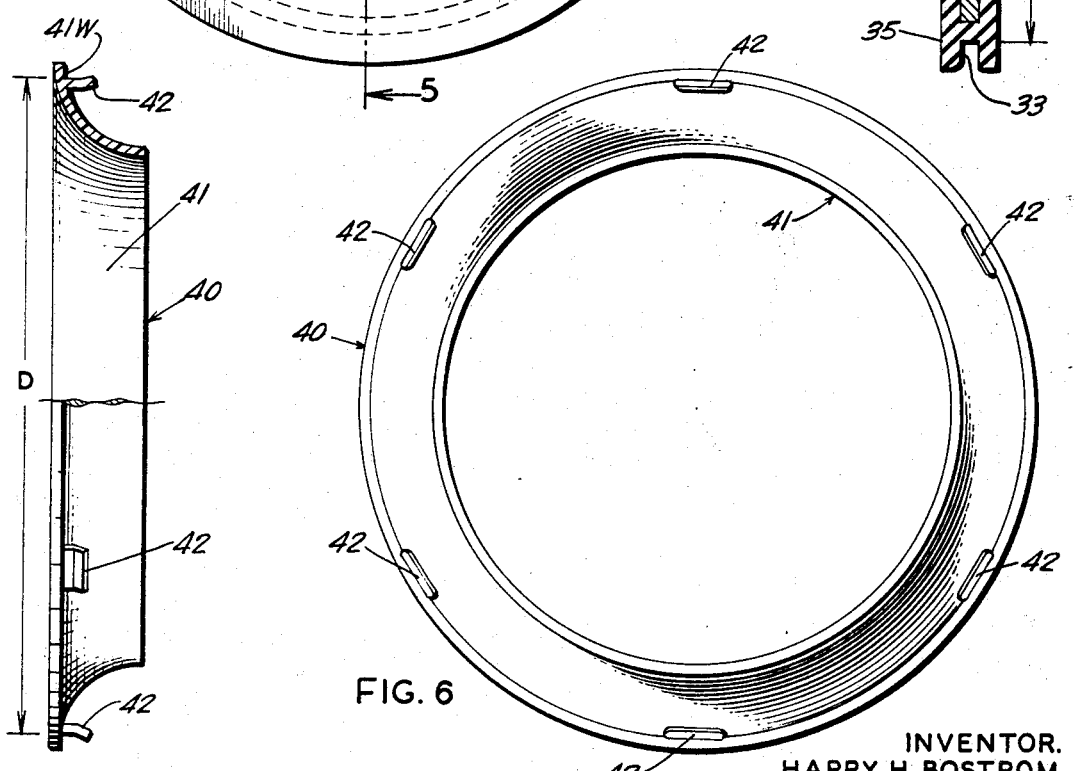
FIG. 6 is a plan view of the inlet fitting.

In the relationship illustrated in FIG. 3, the aperture 31A in the impeller housing constitutes the inlet opening, and in effect defines the entrance for air that is to be subjected to pressurization by the rotating impeller incidental to delivering a forced stream of cooling air through the outlet 26. However, and as an incident to increased efficiency, the inlet may be provided with an inlet fitting 40, FIGS. 3, 6 and 7, presenting a typical venturi throat 41 of the usual narrowing contour pointing in the direction of the impeller 14 as shown in FIG. 3. As in the instance of the housing 20, the inlet fitting is of molded, one-piece plastic form. Attaching tabs 42 are molded integral therewith and project inwardly from the outer marginal wall portion 41W of the fitting which fits flush against the marginal portion of the housing 20 which borders the aperture 31A as shown in FIG. 3. The attaching tabs 42 are slightly bent in a radial outward direction so that these will snap-fit against the peripheral edge of the aperture 31A characterizing a detachable mounting of the inlet fitting to the inlet of the impeller housing.

It will be recognized from the description set forth above that the impeller housing 20 is detachably fitted to the gasket 35, and the inlet fitting is detachably mounted in turn to the impeller housing. However, inasmuch as the apertures 30A and 31A are of substantial identical size and shape, either one can serve alternately as the inlet opening. In this connection, attention is directed to FIGS. 1, 1A, 2 and 2A. Referring to FIG. 1, the impeller housing and the gasket have been rotated on the fixed gasket support 21 so that the outlet is in position I. However, by turning the housing and gasket on the support 21, the outlet can be located in a lower position, II, FIG. 1A, during one hand of rotation.

However, by detaching the inlet fitting, FIG. 3, and separating the impeller housing 20 from the gasket 35, the housing can be reversed or so positioned as to present the aperture 31A to the groove 33 of the gasket. Thus, what was previously the inlet opening 31A now becomes the gasket mounting aperture of the impeller housing, and what was previously the gasket mounting aperture 30A now becomes the blower inlet in which the fitting 40 can again be detachably mounted. This reversal of the housing, FIGS. 2 and 2A, now enables the outlet to occupy alternative positions III and IV during rotation in the opposite hand compared to FIGS. 1 and 1A.

The foregoing objects of the present invention are achieved with few and inexpensive parts. Both openings 30A and 31A define seal edges fittable in the gasket groove or otherwise to have a seal fit therewith, and each such opening will receive the inlet fitting. Thus, as shown in FIGS. 5 and 7, the mounting diameters D of the gasket and the inlet fitting are the same, each presenting a diameter approximately the same as the apertures 30A and 31A. Resultantly, the blower outlet can be set in any position for any direction of cooling, and hence while I have illustrated and described a preferred embodiment of my invention, it is to be understood that this is capable of variation and modification.

I claim:

1. A blower comprising a motor and a motor housing, an impeller driven by the motor, a circular gasket of flexible material supported by said motor housing, an impeller housing having a pair of side walls and a radial wall enveloping the impeller, said impeller housing having an outlet in the radial wall and a pair of inlet openings of substantially the same dimension formed respectively in said side walls, the edge of one of said inlet openings of said impeller housing being seal fitted with and rotatably supported by said gasket whereby a frictional fit is formed between said impeller housing and said motor housing so that said impeller housing outlet may be rotated between opposed positions during one hand of rotation, the edge of the other of said inlet openings defining the effective inlet opening but being interchangeably fittable on the gasket enabling the housing to be reversed on the gasket for rotation in the opposite hand of rotation, and an inlet fitting of plastic material frictionally mounted in the effective inlet opening which is free of the gasket, said inlet fitting being interchangeably fittable in the other inlet opening in the impeller housing when the impeller housing is reversed.

2. A blower according to claim 1 wherein the inlet fitting is snap-fitted in place.

3. A blower according to claim 2 wherein the outer edge of said gasket is grooved with the seal fit edge of the non-effective inlet opening of the impeller housing detachably seated therein, the inner edge of the gasket being grooved and detachably fitted to a gasket support plate which is detachably connected to the motor housing.

References Cited

UNITED STATES PATENTS

| 655,602 | 8/1900 | Burns | 230—133 |
| 2,020,092 | 11/1935 | Allen | 230—235 |
| 2,188,807 | 1/1940 | Castricone | 230—232 |
| 2,215,666 | 9/1940 | Meitzler | 230—235 |
| 2,885,142 | 5/1959 | Eberhart | 230—235 |
| 2,928,961 | 3/1960 | Morrill | 230—235 |

FOREIGN PATENTS 1,273,994  9/1961  France.

HENRY F. RADUAZO, *Primary Examiner.*